UNITED STATES PATENT OFFICE.

CARL REINKE, OF BREDELAR, GERMANY.

PROCESS OF BRIQUETING FRIABLE ORES.

No. 833,630.

Specification of Letters Patent.

Patented Oct. 16, 1906.

Application filed October 26, 1905. Serial No. 284,577.

*To all whom it may concern:*

Be it known that I, CARL REINKE, fabricant, a subject of the German Emperor, and a resident of Bredelar, Province of Westphalia, Germany, have invented new and useful Improvements in Processes for Briqueting Friable Ores, of which the following is a specification.

The purpose of the present invention is to bring natural friable ores and ore waste or dross by means of a suitable method with the addition of suitable material into briquet form and to adapt the same for use for the smelting process in the blast-furnaces.

Under my invention it is possible to produce an ore briquet which satisfies all requirements as regards resistivity and cost of production, and like piece ores can be smelted duly in the blast-furnace without pulverizing of the briquet. A special advantage is the low percentage of water in such a prepared briquet, analysis showing the following composition: iron, 56.78 per cent.; residue, 3.60 per cent.; lime, 7.01 per cent.; moisture, 0.55 per cent.

The briquets produced according to this method need not be dried in special furnaces at high temperature, and, besides this, a further saving of expense in the cost of transport is obtained, as unprepared ore contains eighteen to twenty per cent. of water, so that about twenty-five per cent. of the cost of transport is saved.

The new method consists chiefly in this that to the friable ores as a binding agent is added so-called "Permian" limestone or other limestone containing a high percentage of calcium carbonate, an addition of a small quantity of magnesia and good Portland cement, which serves to stimulate the binding power of the Permian limestone or other limestone. Four parts of limestone are mixed with one part of cement; but these mixing proportions may vary according to the kind of ore to be briqueted. It is to be noted that the binding agent must be finely ground and must be intimately mixed. The mixture of the Permian limestone or other limestone with cement possesses an enormous binding power, and the ore to be briqueted is intimately mixed with the Permian limestone or other limestone cement mixture, and the mass so obtained is pressed under great pressure into briquets, whereupon the greatest part of the moisture still present is expelled. The briquets thus produced stand red heat perfectly and remain solid until removed from the furnace, which is due to the fact that the most finely-ground binding agent has good binding power, but no explosive power. The added lime exerts a favorable influence on the smelting process.

The proportion of ore to be briqueted to the Permian limestone or other limestone cement mixture varies, as already mentioned, according to the quality of the ore to be briqueted. Thus, for example, in poor ores an addition of one part of this mixture to six parts of ore is sufficient.

What I do claim as my invention, and desire to secure by Letters Patent, is—

1. The process of briqueting comminuted mineral substances consisting in mixing the ores with finely-ground so-called Permian limestone and good Portland cement and in molding this mixture into briquets under high pressure substantially as herein described.

2. The herein-described process of briqueting comminuted mineral substances consisting of friable ores, with ing in mixing six parts of friable ores, with one part finely-ground limestone containing a high percentage of carbonate of lime and a small addition of finely-ground magnesia and good Portland cement and in molding this mixture into briquets under high pressure substantially as herein described.

In testimony whereof I have signed my name to this specification in the presence of two subscribing witnesses.

CARL REINKE.

Witnesses:
 OTTO LOWTZ,
 LUDWIG GUNDLACH.